(12) United States Patent
Chikugo et al.

(10) Patent No.: US 10,873,094 B2
(45) Date of Patent: Dec. 22, 2020

(54) FUEL CELL SYSTEM

(75) Inventors: Hayato Chikugo, Stuttgart (DE);
Hidetaka Nishimura, Yokosuka (JP)

(73) Assignee: NISSAN MOTOR CO., LTD.,
Yokohama (JP)

( * ) Notice: Subject to any disclaimer, the term of this patent is extended or adjusted under 35 U.S.C. 154(b) by 1380 days.

(21) Appl. No.: 14/342,167

(22) PCT Filed: Aug. 2, 2012

(86) PCT No.: PCT/JP2012/069667
§ 371 (c)(1),
(2), (4) Date: Feb. 28, 2014

(87) PCT Pub. No.: WO2013/031470
PCT Pub. Date: Mar. 7, 2013

(65) Prior Publication Data
US 2014/0220467 A1 Aug. 7, 2014

(30) Foreign Application Priority Data
Sep. 2, 2011 (JP) .................................. 2011-191814

(51) Int. Cl.
*H01M 8/04* (2016.01)
*H01M 8/04007* (2016.01)
(Continued)

(52) U.S. Cl.
CPC ... *H01M 8/04074* (2013.01); *H01M 8/04067* (2013.01); *H01M 8/04768* (2013.01);
(Continued)

(58) Field of Classification Search
CPC ......... H01M 8/04067; H01M 8/04074; H01M 8/04358; H01M 8/04417; H01M 8/04723; H01M 8/04768
(Continued)

(56) References Cited

U.S. PATENT DOCUMENTS 6,651,761 B1 11/2003 Hrovat et al.
2003/0072981 A1* 4/2003 Imaseki ............ H01M 8/04029
429/434
(Continued)

FOREIGN PATENT DOCUMENTS

JP 2006-302739 A 11/2006
JP 2008-91314 A 4/2008
(Continued)

*Primary Examiner* — Jonathan G Jelsma
*Assistant Examiner* — Omar M Kekia
(74) *Attorney, Agent, or Firm* — Foley & Lardner LLP

(57) ABSTRACT

A fuel cell system includes: a coolant circulation passage through which a coolant for cooling a fuel cell circulates; a pump that circulates the coolant; a radiation unit that cools the coolant by discharging heat from the coolant; a bypass passage connected to the coolant circulation passage so as to bypass the radiation unit; and an open/close valve that is provided in a convergence portion where low temperature coolant that has passed through the radiation unit and high temperature coolant that has passed through the bypass passage without passing through the radiation unit converge, and that opens when a temperature of the high temperature coolant reaches or exceeds a predetermined opening temperature, whereby the low temperature coolant and the high temperature coolant converge and are supplied thus to the fuel cell, wherein a basic discharge flow of the pump is calculated in accordance with a condition of the fuel cell, and when the temperature of the low temperature coolant is lower than a predetermined temperature, a discharge flow of the pump is increased above the basic discharge flow.

11 Claims, 15 Drawing Sheets

(51) Int. Cl.
*H01M 8/04746* (2016.01)
*H01M 8/04701* (2016.01)
*H01M 8/0432* (2016.01)
*H01M 8/0438* (2016.01)

(52) U.S. Cl.
CPC .... *H01M 8/04358* (2013.01); *H01M 8/04417* (2013.01); *H01M 8/04723* (2013.01)

(58) Field of Classification Search
USPC .................................. 429/434, 156; 49/434
See application file for complete search history.

(56) References Cited

U.S. PATENT DOCUMENTS

| | | | | |
|---|---|---|---|---|
| 2003/0165725 | A1* | 9/2003 | Kudou | H01M 8/241 |
| | | | | 429/435 |
| 2007/0065690 | A1* | 3/2007 | Schaefer | F04D 27/001 |
| | | | | 429/434 |
| 2009/0169928 | A1* | 7/2009 | Nishimura | H01M 8/04037 |
| | | | | 429/415 |
| 2009/0214909 | A1* | 8/2009 | Igarashi | H01M 8/04097 |
| | | | | 429/421 |
| 2009/0311565 | A1* | 12/2009 | Ishikawa | B60H 1/00885 |
| | | | | 429/413 |
| 2010/0323261 | A1* | 12/2010 | Igarashi | H01M 8/04029 |
| | | | | 429/436 |

FOREIGN PATENT DOCUMENTS

| | | |
|---|---|---|
| JP | 2010-67460 A | 3/2010 |
| JP | 2010-140678 A | 6/2010 |
| JP | 2010-177046 A | 8/2010 |

\* cited by examiner

FUEL CELL SYSTEM

TECHNICAL FIELD

The present invention relates to a fuel cell system.

BACKGROUND ART

JP2006-302739A describes a conventional fuel cell system in which a circulation path of cooling water for cooling a fuel cell stack is switched using a solenoid three-way valve.

SUMMARY OF INVENTION

To simplify a fuel cell system, use of a thermostat instead of a solenoid three-way valve is under investigation. It has been found, however, that when a thermostat is used instead of a solenoid three-way valve and the thermostat is opened while a temperature of cooling water that has passed through a radiator is low, the temperature of the cooling water decreases rapidly in the interior of the thermostat such that the thermostat is opened and closed repeatedly, leading to hunting in which the temperature of the cooling water supplied to the fuel cell stack oscillates.

The present invention has been designed in consideration of this problem, and an object thereof is to suppress hunting.

According to an aspect of the present invention, a fuel cell system includes: a coolant circulation passage through which a coolant for cooling a fuel cell circulates; a pump provided in the coolant circulation passage to circulate the coolant; a radiation unit provided in the coolant circulation passage to cool the coolant by discharging heat from the coolant; a bypass passage connected to the coolant circulation passage so as to bypass the radiation unit; and an open/close valve that is provided in a convergence portion where low temperature coolant that has passed through the radiation unit and high temperature coolant that has passed through the bypass passage without passing through the radiation unit converge, and that opens when a temperature of the high temperature coolant reaches or exceeds a predetermined opening temperature, whereby the low temperature coolant and the high temperature coolant converge and are supplied thus to the fuel cell, wherein a basic discharge flow of the pump is calculated in accordance with a condition of the fuel cell, and when the temperature of the low temperature coolant is lower than a predetermined temperature, a discharge flow of the pump is increased above the basic discharge flow.

Embodiments and advantages of the present invention will be described in detail below with reference to the attached drawings.

DESCRIPTION OF EMBODIMENTS

First Embodiment

In a fuel cell, a polymer electrolyte membrane is sandwiched between an anode electrode (a fuel electrode) and a cathode electrode (an oxidant electrode), and power is generated by supplying anode gas (fuel gas) containing hydrogen to the anode electrode and cathode gas (oxidant gas) containing oxygen to the cathode electrode. Electrode reactions proceeding respectively in the anode electrode and the cathode electrode are as follows.

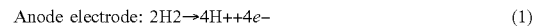

Anode electrode: $2H_2 \rightarrow 4H^+ + 4e^-$ (1)

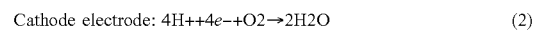

Cathode electrode: $4H^+ + 4e^- + O_2 \rightarrow 2H_2O$ (2)

As a result of the electrode reactions shown in (1) and (2), the fuel cell generates approximately one volt of electromotive force.

When a fuel cell is used as an automobile power source, a large amount of power is required, and therefore several hundred fuel cells are laminated for use as a fuel cell stack. A fuel cell system is constructed to supply anode gas and cathode gas to the fuel cell stack, and power for driving the vehicle is extracted from the fuel cell system.

Figure 1:
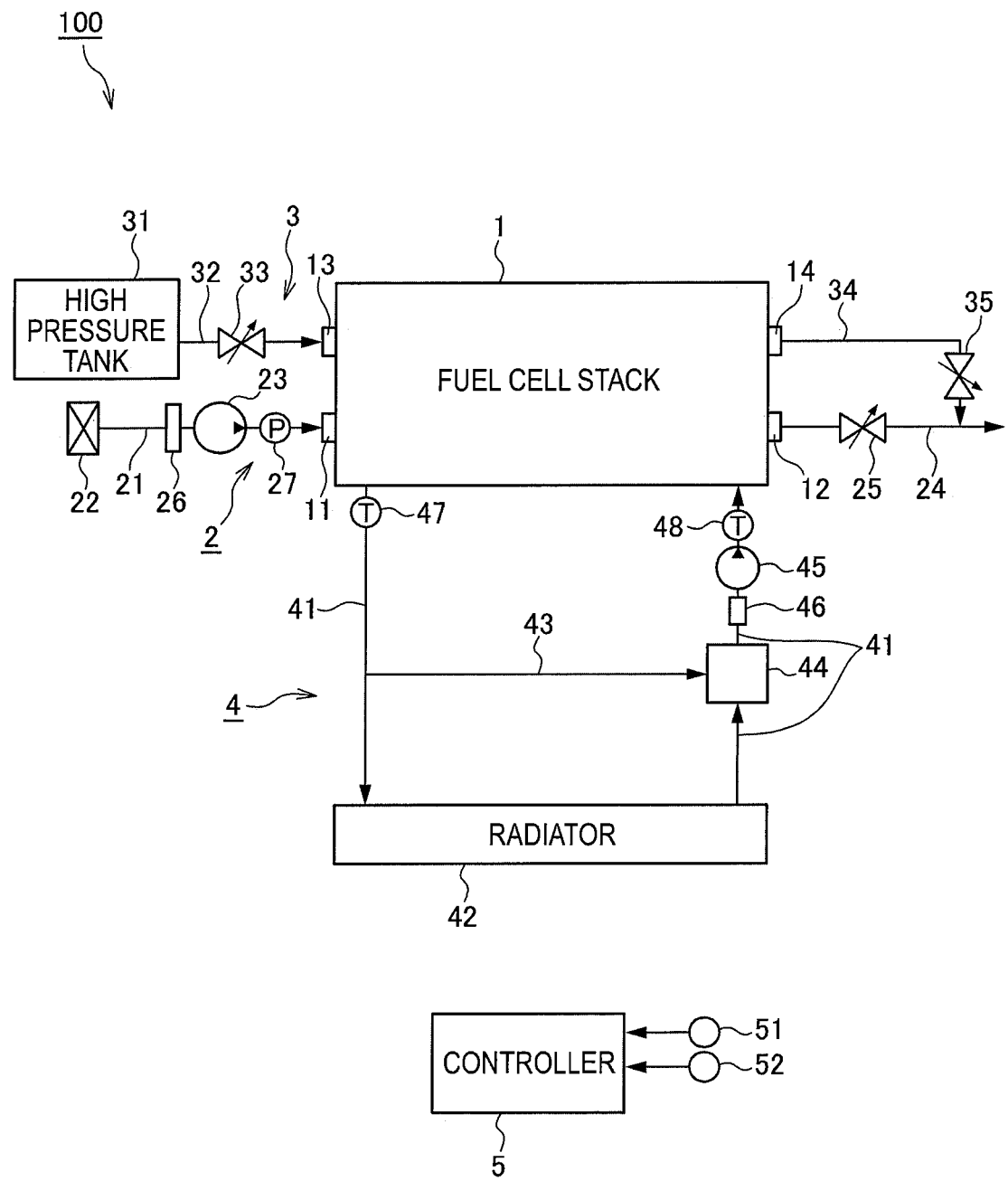
FIG. 1 is a schematic view showing a fuel cell system according to a first embodiment of the present invention.

FIG. 1 is a schematic view showing a fuel cell system 100 according to a first embodiment of the present invention.

The fuel cell system 100 includes a fuel cell stack 1, a cathode gas supply/discharge device 2, an anode gas supply/discharge device 3, a stack cooling device 4, and a controller 5.

The fuel cell stack 1 is formed by laminating several hundred fuel cells, and generates power required to drive a vehicle upon reception of supplies of anode gas and cathode gas.

The cathode gas supply/discharge device 2 supplies cathode gas to the fuel cell stack 1 and discharges cathode off gas discharged from the fuel cell stack 1 into the outside air. The cathode gas supply/discharge device 2 includes a cathode gas supply passage 21, a filter 22, a cathode compressor 23, a cathode gas exhaust passage 24, a cathode pressure regulating valve 25, an air flow sensor 26, and a pressure sensor 27.

The cathode gas supply passage 21 is a passage through which the cathode gas supplied to the fuel cell stack 1 passes. The cathode gas supply passage 21 is connected to the filter 22 at one end and to a cathode gas inlet hole 11 of the fuel cell stack 1 at another end.

The filter 22 removes foreign matter from the cathode gas taken into the cathode gas supply passage 21.

The cathode compressor 23 is provided in the cathode gas supply passage 21. The cathode compressor 23 takes air (outside air) serving as the cathode gas into the cathode gas supply passage 21 via the filter 22, and supplies the cathode gas to the fuel cell stack 1.

The cathode gas exhaust passage 24 is a passage through which the cathode off gas discharged from the fuel cell stack 1 flows. The cathode gas exhaust passage 24 is connected to a cathode gas outlet hole 12 of the fuel cell stack 1 at one end and, and another end thereof is open.

The cathode pressure regulating valve 25 is provided in the cathode gas exhaust passage 24. The cathode pressure regulating valve 25 is controlled to open and close by the controller 5 in order to regulate a pressure (to be referred to hereafter as a "cathode pressure") in the passage through which the cathode gas flows on an upstream side of the cathode pressure regulating valve 25 to a desired pressure.

The air flow sensor 26 is provided in the cathode gas supply passage 21 upstream of the cathode compressor 23. The air flow sensor 26 detects a flow of the cathode gas flowing through the cathode gas supply passage 21.

The pressure sensor 27 is provided in the cathode gas supply passage 21 in the vicinity of the cathode gas inlet hole 11. The pressure sensor 27 detects the cathode pressure. The controller 5 regulates the cathode pressure to the desired pressure by adjusting an opening of the cathode pressure regulating valve 25 on the basis of a detection value from the pressure sensor 27.

The anode gas supply/discharge device 3 supplies anode gas to the fuel cell stack 1 and discharges anode off gas discharged from the fuel cell stack 1 into the cathode gas exhaust passage 24. The anode gas supply/discharge device 3 includes a high pressure tank 31, an anode gas supply passage 32, an anode pressure regulating valve 33, an anode gas exhaust passage 34, and a purge valve 35.

The high pressure tank 31 stores the anode gas to be supplied to the fuel cell stack 1 in a high pressure condition.

The anode gas supply passage 32 is a passage for supplying anode gas discharged from the high pressure tank 31 to the fuel cell stack 1. The anode gas supply passage 32 is connected to the high pressure tank 31 at one end and to an anode gas inlet hole 13 of the fuel cell stack 1 at another end.

The anode pressure regulating valve 33 is provided in the anode gas supply passage 32. The anode pressure regulating valve 33 is controlled to open and close by the controller 5 in order to regulate a pressure of the anode gas that flows out of the high pressure tank 31 into the anode gas supply passage 32 to a desired pressure.

The anode gas exhaust passage 34 is a passage through which the anode gas discharged from the fuel cell stack 1 flows. The anode gas exhaust passage 34 is connected to an anode gas outlet hole 14 of the fuel cell stack 1 at one end and to the cathode gas exhaust passage 24 at another end.

The purge valve 35 is provided in the anode gas exhaust passage 34. The purge valve 35 is controlled to open and close by the controller 5 in order to control a flow of the anode off gas that is discharged from the anode gas exhaust passage 34 into the cathode gas exhaust passage 24.

The stack cooling device 4 cools the fuel cell stack 1 to maintain the fuel cell stack 1 at a suitable temperature for power generation. The stack cooling device 4 includes a cooling water circulation passage 41, a radiator 42, a bypass passage 43, a thermostat 44, a circulating pump 45, a heater 46, a first water temperature sensor 47, and a second water temperature sensor 48.

The cooling water circulation passage 41 is a passage through which cooling water for cooling the fuel cell stack 1 circulates.

The radiator 42 is provided in the cooling water circulation passage 41. The radiator 42 cools the cooling water discharged from the fuel cell stack 1.

The bypass passage 43 is connected to the cooling water circulation passage 41 at one end and to the thermostat 44 at another end so as to be capable of circulating the cooling water while bypassing the radiator 42.

The thermostat 44 is provided in the cooling water circulation passage 41 on a downstream side of the radiator 42. The thermostat 44 is an open/close valve that opens and closes automatically in accordance with a temperature of the cooling water flowing through the interior thereof. The thermostat 44 closes when the temperature of the cooling water flowing through the interior thereof is lower than a predetermined thermostat opening temperature, whereby only the relatively high-temperature cooling water that has passed through the bypass passage 43 is supplied to the fuel cell stack 1. When the temperature of the cooling water flowing through the interior of the thermostat 44 equals or exceeds the thermostat opening temperature, on the other hand, the thermostat 44 starts to open gradually, whereby the cooling water that has passed through the bypass passage 42 and the relatively low-temperature cooling water that has passed through the radiator 42 intermix in the interior of the thermostat 44 and are supplied thus to the fuel cell stack. Hence, the cooling water that passes through the bypass passage 43 flows into the thermostat 44 regardless of the open/closed condition thereof.

The thermostat 44 may be configured such that when an opening thereof equals or exceeds a predetermined opening, the cooling water from the bypass passage 42 is prevented from flowing therein, whereby only the cooling water passing through the radiator 42 is supplied to the fuel cell stack 1. Further, the thermostat opening temperature may be adjusted in accordance with a wax material and a spring constituting the thermostat 44, and should be set appropriately in accordance with characteristics of the fuel cell stack 1.

The circulating pump 45 is provided in the cooling water circulation passage 41 on a downstream side of the thermostat 44 to circulate the cooling water. A discharge flow (to be referred to hereafter as a "pump flow") of the circulating pump 45 is controlled by the controller 5.

The heater 46 is provided in the cooling water circulation passage 41 between the thermostat 44 and the circulating pump 45. The heater 46 is energized while warming up the fuel cell stack 1 in order to raise the temperature of the cooling water. In this embodiment, a PTC heater is used as the heater 46, but the heater 46 is not limited thereto.

The first water temperature sensor 47 is provided in the cooling water circulation passage 41 on an upstream side of a bifurcation point between the cooling water circulation passage 41 and the bypass passage 43. The first water temperature sensor 47 detects a temperature (to be referred to hereafter as a "stack outlet water temperature") of the cooling water discharged from the fuel cell stack 1. The stack outlet water temperature corresponds to the temperature of the fuel cell stack (to be referred to hereafter as a "stack temperature").

The second water temperature sensor 48 is provided in the cooling water circulation passage 41 on the downstream side of the circulating pump 45. The second water temperature sensor 48 detects a temperature (to be referred to hereafter as a "stack inlet water temperature") of the cooling water flowing into the fuel cell stack 1. In this embodiment, the stack inlet water temperature detected by the second water temperature sensor 48 represents the temperature of the cooling water flowing through the interior of the thermostat 44.

The controller 5 is constituted by a microcomputer including a central processing unit (CPU), a read-only memory (ROM), a random access memory (RAM), and an input/output interface (I/O interface). Signals from various sensors required to control the fuel cell system 100, including, in addition to the first water temperature sensor 47 and the second water temperature sensor 48 described above, an outside air temperature sensor 51 that detects an outside air temperature, a current sensor 52 that detects an output current of the fuel cell stack 1 serving as a load (to be referred to hereafter as a "stack load") exerted on the fuel cell stack 1, and so on, are input into the controller 5. In this embodiment, the outside air temperature detected by the outside air temperature sensor 51 represents a temperature (to be referred to hereafter as a "radiator outlet water temperature") of the cooling water discharged from the radiator 42.

It has been found that when a cooling water circulation path is switched using the thermostat 44, as in this embodiment, a following problem occurs.

The stack outlet water temperature is normally equal to the outside air temperature when the fuel cell system 100 is started up. Hence, for a while after startup of the fuel cell system 100, the temperature of the cooling water flowing through the interior of the thermostat 44 is lower than the thermostat opening temperature, and therefore only the cooling water that has passed through the bypass passage 43 is supplied to the fuel cell stack 1.

When the temperature of the cooling water is increased thereafter through heat exchange with the fuel cell stack 1 such that the stack outlet water temperature rises to the thermostat opening temperature, the thermostat 44 opens, with the result that the cooling water passing through the bypass passage 43 and the cooling water passing through the radiator 42 intermix in the interior of the thermostat 44 and are supplied thus to the fuel cell stack 1.

At this time, the cooling water that has passed through the radiator 42 is cooled by the radiator 42 to an equal temperature to the outside air temperature. Therefore, in a particularly low temperature environment where the outside air temperature falls below 0° C., a temperature difference between the temperature (the stack outlet water temperature) of the cooling water that has passed through the bypass passage 43 and the temperature (the radiator outlet water temperature) of the cooling water that has passed through the radiator 42 may increase such that the temperature of the intermixed cooling water in the thermostat 44 decreases rapidly. It has been found that this leads to hunting, in which the thermostat 44 opens and closes repeatedly such that the temperature (the stack inlet water temperature) of the cooling water supplied to the fuel cell stack 1 oscillates.

Hence, in this embodiment, the possibility of hunting is determined from the radiator outlet water temperature, and when the possibility of hunting exists, the pump flow is increased at a point where the stack outlet water temperature rises to the vicinity of the thermostat opening temperature. In so doing, the flow of the cooling water that flows into the thermostat 44 from the bypass passage 43 can be increased, enabling an increase in a flow velocity of the cooling water flowing through the thermostat 44. Accordingly, a rapid decrease in the cooling water temperature in the thermostat 44 occurring when the thermostat 44 opens such that the cooling water passing through the radiator 42 flows therein can be suppressed, and as a result, hunting can be suppressed.

Referring to FIGS. 2 to 7, circulating pump flow control according to this embodiment will be described below.

Figure 2:
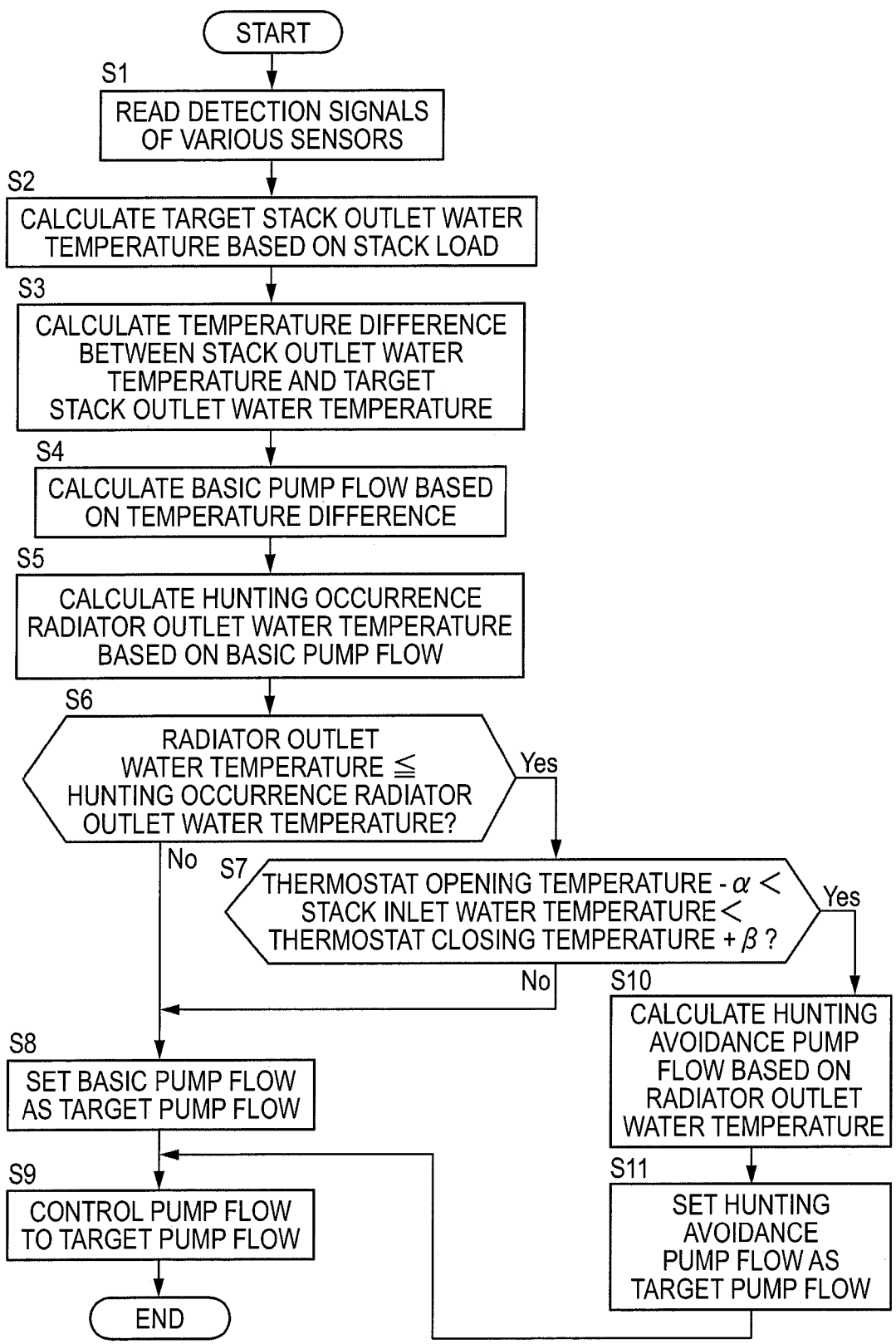
FIG. 2 is a flowchart illustrating pump flow control performed on a circulating pump according to the first embodiment of the present invention.

FIG. 2 is a flowchart illustrating the pump flow control performed on the circulating pump according to this embodiment. The controller 5 executes this routine at predetermined calculation period intervals (every 10 [ms], for example) while the fuel cell system 100 is operative.

In a step S1, the controller 5 reads detection signals from the various sensors.

In a step S2, the controller 5 refers to a table shown in FIG. 3, to be described below, to calculate a target value of the stack outlet water temperature (to be referred to hereafter as a "target stack outlet water temperature") on the basis of the stack load, or in other words the output current detected by the current sensor 52.

In a step S3, the controller 5 calculates a temperature difference between the stack outlet water temperature detected by the first water temperature sensor 47 and the target stack outlet water temperature.

In a step S4, the controller 5 refers to a table shown in FIG. 4, to be described below, to calculate a basic value of the pump flow (to be referred to hereafter as a "basic pump flow") on the basis of the temperature difference between the stack outlet water temperature and the target stack outlet water temperature.

In a step S5, the controller 5 refers to a table shown in FIG. 5, to be described below, to calculate a radiator outlet water temperature at which hunting starts to occur (to be referred to hereafter as a "hunting occurrence radiator outlet water temperature") on the basis of the basic pump flow. The hunting occurrence radiator outlet water temperature is a temperature at which hunting may occur if the thermostat is opened while the radiator outlet water temperature is lower than the hunting occurrence radiator outlet water temperature when the pump flow is limited to the basic pump flow.

In a step S6, the controller 5 determines whether or not the radiator outlet water temperature is equal to or lower than the hunting occurrence radiator outlet water temperature. When the radiator outlet water temperature is equal to or lower than the hunting occurrence radiator outlet water temperature, the controller 5 performs processing of a step S7. When the radiator outlet water temperature is higher than the hunting occurrence radiator outlet water temperature, on the other hand, the controller 5 performs processing of a step S8.

In the step S7, the controller 5 determines whether or not the temperature of the intermixed cooling water in the thermostat 44, or in other words the stack inlet water temperature, is within a predetermined range. More specifically, the controller 5 determines whether or not the stack inlet water temperature is higher than a temperature (to be referred to hereafter as an "increase start temperature") obtained by subtracting a first predetermined temperature α from the thermostat opening temperature and lower than a temperature (to be referred to hereafter as an "increase stop temperature") obtained by adding a second predetermined temperature β to a predetermined thermostat closing temperature. A method of setting the first predetermined temperature α and the second predetermined temperature β will be described below with reference to FIG. 6. When the stack inlet water temperature is not within the predetermined range, the controller 5 performs the processing of the step S8. When the stack inlet water temperature is within the predetermined range, on the other hand, the controller 5 performs processing of a step S10.

In the step S8, the controller 5 sets the basic pump flow as a target pump flow. The reason for this is that when the radiator outlet water temperature is higher than the hunting occurrence radiator outlet water temperature, there is no danger of hunting occurring, and therefore the pump flow does not have to be increased. Further, when the pump flow is increased before the increase start temperature is reached, a system efficiency and a warm-up performance of the fuel cell system 100 deteriorate.

In a step S9, the controller 5 controls the circulating pump such that the pump flow reaches the target pump flow.

In the step S10, the controller 5 refers to a table shown in FIG. 7, to be described below, to calculate a pump flow at which hunting does not occur (to be referred to hereafter as a "hunting avoidance pump flow") on the basis of the radiator outlet water temperature.

In a step S11, the controller 5 sets the hunting avoidance pump flow as the target pump flow, and performs a correction to increase the pump flow above the basic pump flow.

Figure 3:
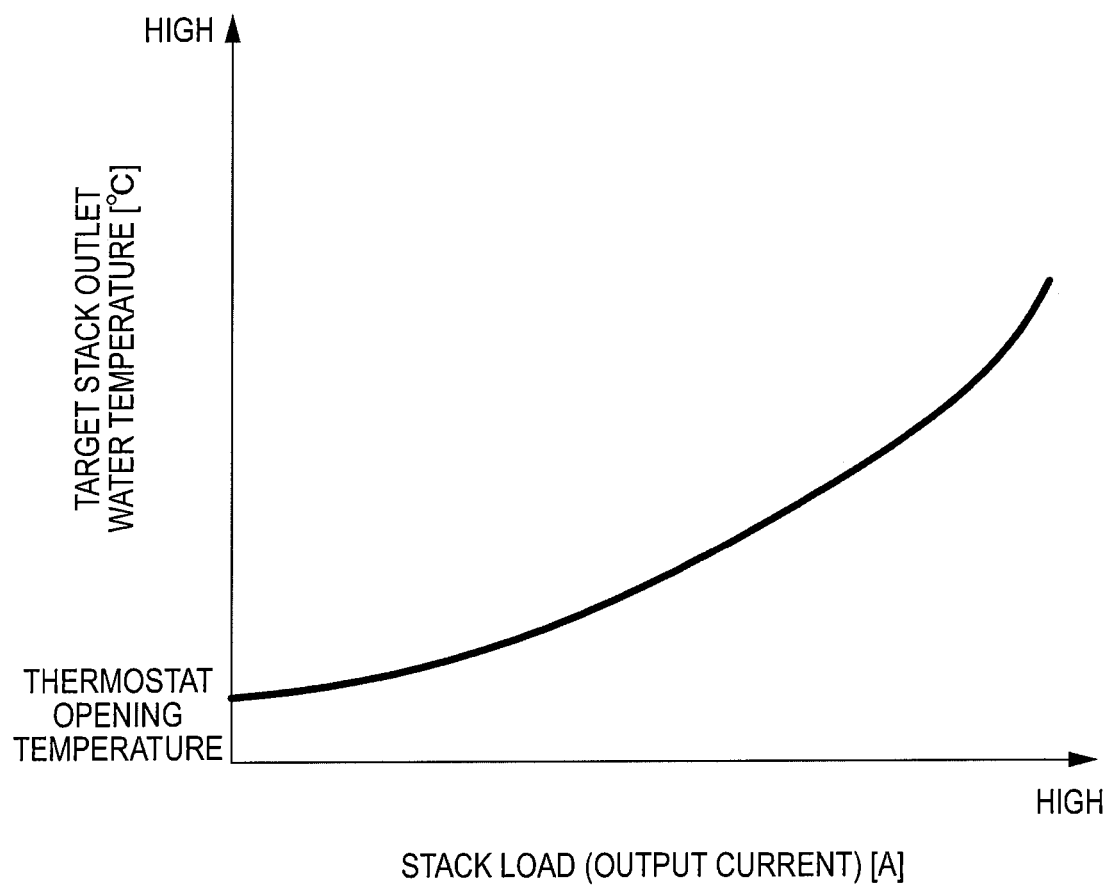
FIG. 3 is a table used to calculate a target stack outlet water temperature on the basis of a stack load.

FIG. 3 is the table used to calculate the target stack outlet water temperature on the basis of the stack load.

As shown in FIG. 3, the target stack outlet water temperature is basically set to be equal to or higher than the thermostat opening temperature, and to increase as the stack load increases.

The reason for this is that as the stack load increases, an amount of water generated in the interior of the fuel cell stack 1 tends to increase, leading to an increase in a moisture content of the polymer electrolyte membrane of each fuel cell constituting the fuel cell stack 1, and therefore the target stack outlet water temperature is set to increase as the stack load increases to ensure that the moisture content of the polymer electrolyte membrane remains constant. By increasing the target stack outlet water temperature, a proportion of the water generated in the interior of the fuel cell stack 1 that turns into water vapor and is discharged as cathode off gas increases, and therefore the moisture content of the polymer electrolyte membrane can be kept constant.

Figure 4:
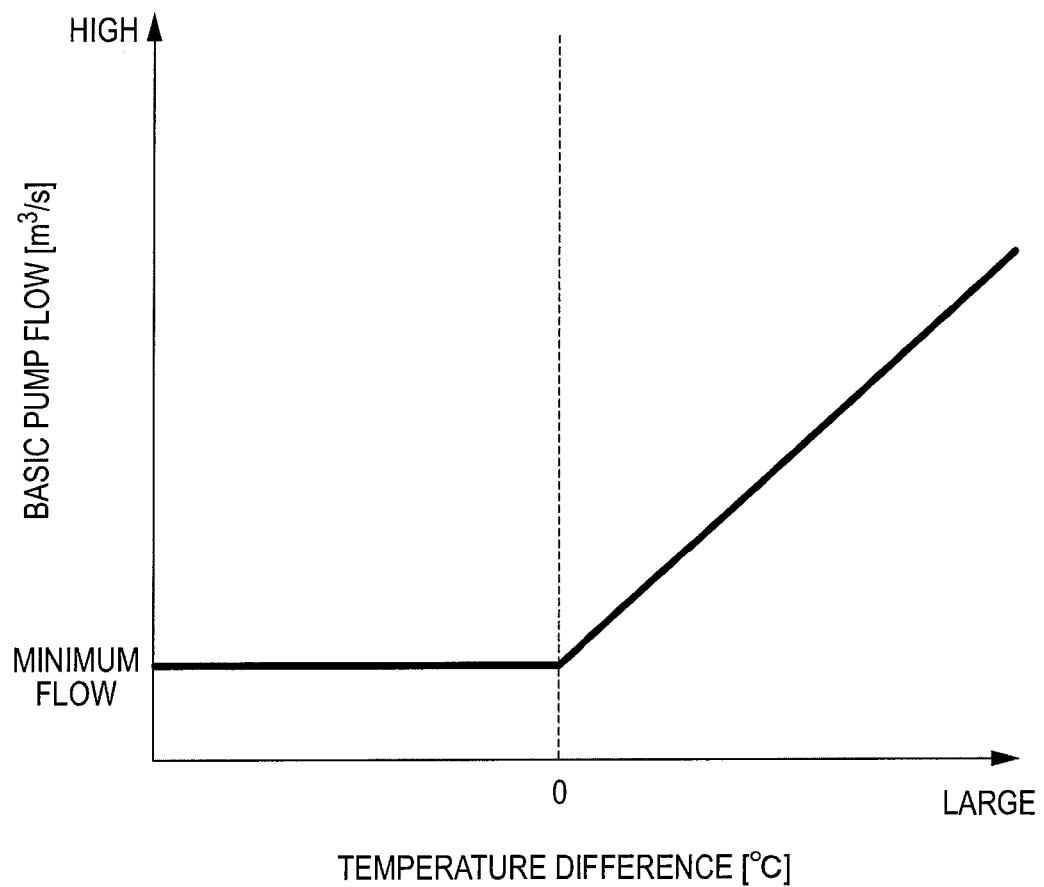
FIG. 4 is a table used to calculate a basic pump flow on the basis of a temperature difference between a stack outlet water temperature and the target stack outlet water temperature.

FIG. 4 is the table used to calculate the basic pump flow on the basis of the temperature difference between the stack outlet water temperature and the target stack outlet water temperature.

As shown in FIG. 4, when the temperature difference between the stack outlet water temperature and the target stack outlet water temperature takes a negative value, or in other words when the stack outlet water temperature is lower than the target stack outlet water temperature, the stack outlet water temperature must be increased, and therefore the pump flow is set at a minimum flow. When, on the other hand, the temperature difference between the stack outlet water temperature and the target stack outlet water temperature takes a positive value, or in other words when the stack outlet water temperature is higher than the target stack outlet water temperature, the stack outlet water temperature must be reduced, and therefore the pump flow is set to increase as the temperature difference increases.

Figure 5:
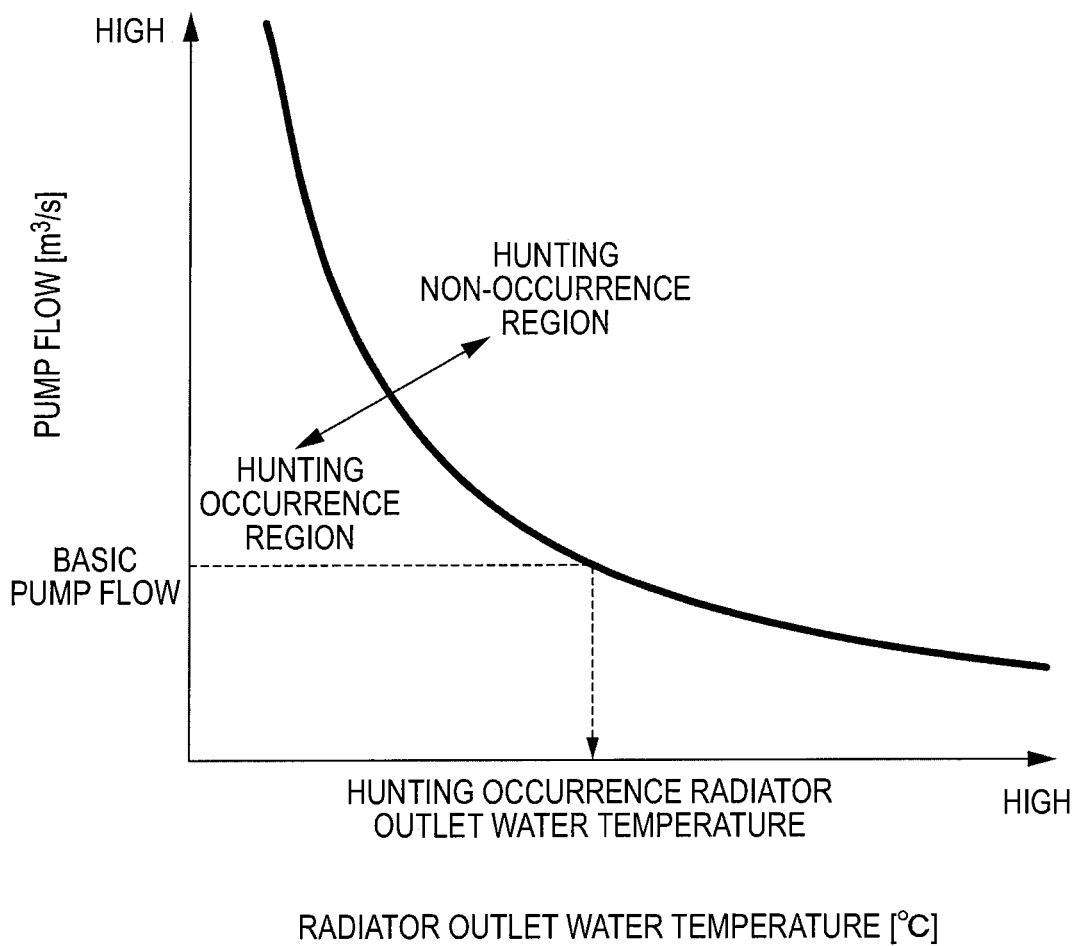
FIG. 5 is a table used to calculate a hunting occurrence radiator outlet water temperature on the basis of the basic pump flow.

FIG. 5 is the table used to calculate the hunting occurrence radiator outlet water temperature on the basis of the basic pump flow.

As shown in FIG. 5, a boundary line at which hunting occurs can be determined in advance from the radiator outlet water temperature and the pump flow by experiment or the like. As the radiator outlet water temperature decreases, the pump flow required to avoid hunting increases.

Figure 6:
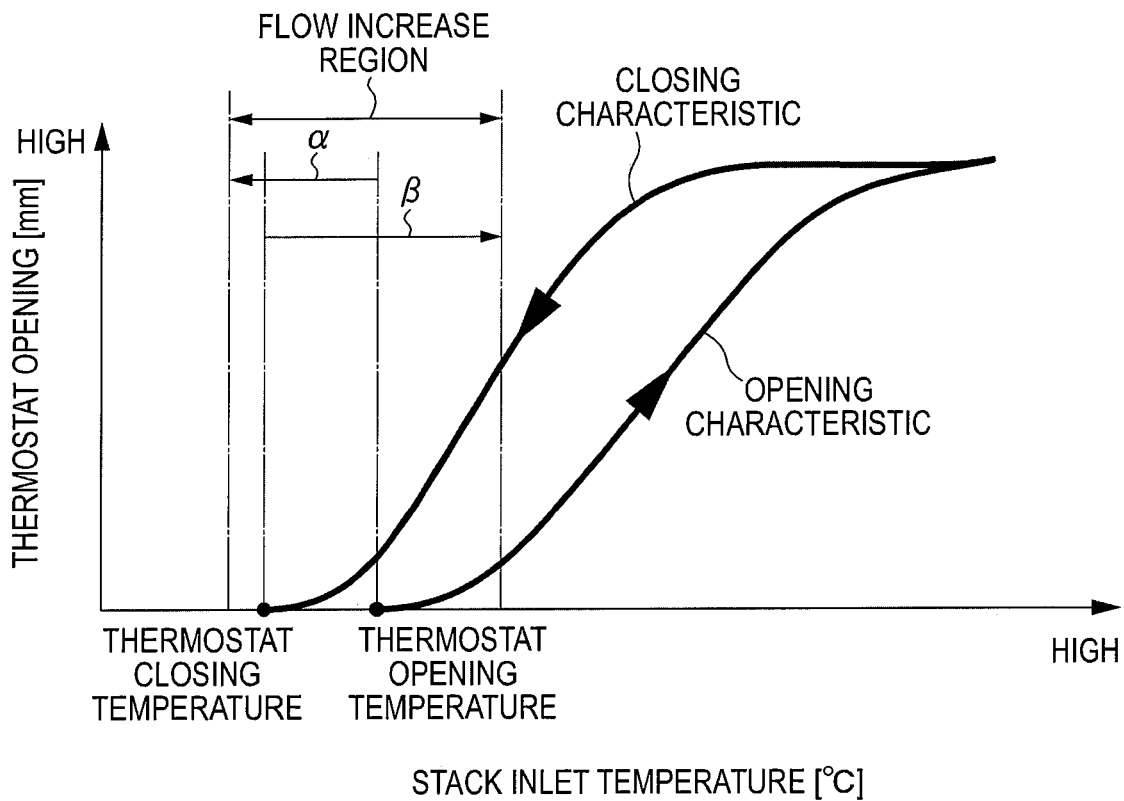
FIG. 6 is a view illustrating a method of setting a first predetermined temperature α and a second predetermined temperature β.

FIG. 6 is a view illustrating the method of setting the first predetermined temperature α and the second predetermined temperature β. FIG. 6 shows a relationship between the stack inlet water temperature and a thermostat opening.

As shown in FIG. 6, at an identical stack inlet temperature, the thermostat opening differs between a case in which the thermostat moves from a fully closed condition to a fully open condition and a case in which the thermostat moves from the fully open condition to the fully closed condition. In other words, a characteristic (to be referred to hereafter as an "opening characteristic") exhibited by the thermostat when moving from the fully closed condition to the fully open condition differs from a characteristic (to be referred to hereafter as a "closing characteristic") exhibited by the thermostat when moving from the fully open condition to the fully closed condition.

In this embodiment, therefore, a predetermined range is determined by setting the first predetermined temperature α and the second predetermined temperature β in consideration of the opening characteristic and closing characteristic of the thermostat.

More specifically, the first predetermined temperature α is set in consideration of the opening characteristic of the thermostat such that a temperature at which to start increasing the pump flow is slightly lower than the thermostat opening temperature, or in other words the temperature at which the thermostat starts to open.

The second predetermined temperature β, meanwhile, is set at a higher temperature than the thermostat closing temperature and the thermostat opening temperature in consideration of the closing characteristic of the thermostat so that the stack inlet water temperature does not return to the thermostat closing temperature after the end of the correction to increase the pump flow.

Figure 7:
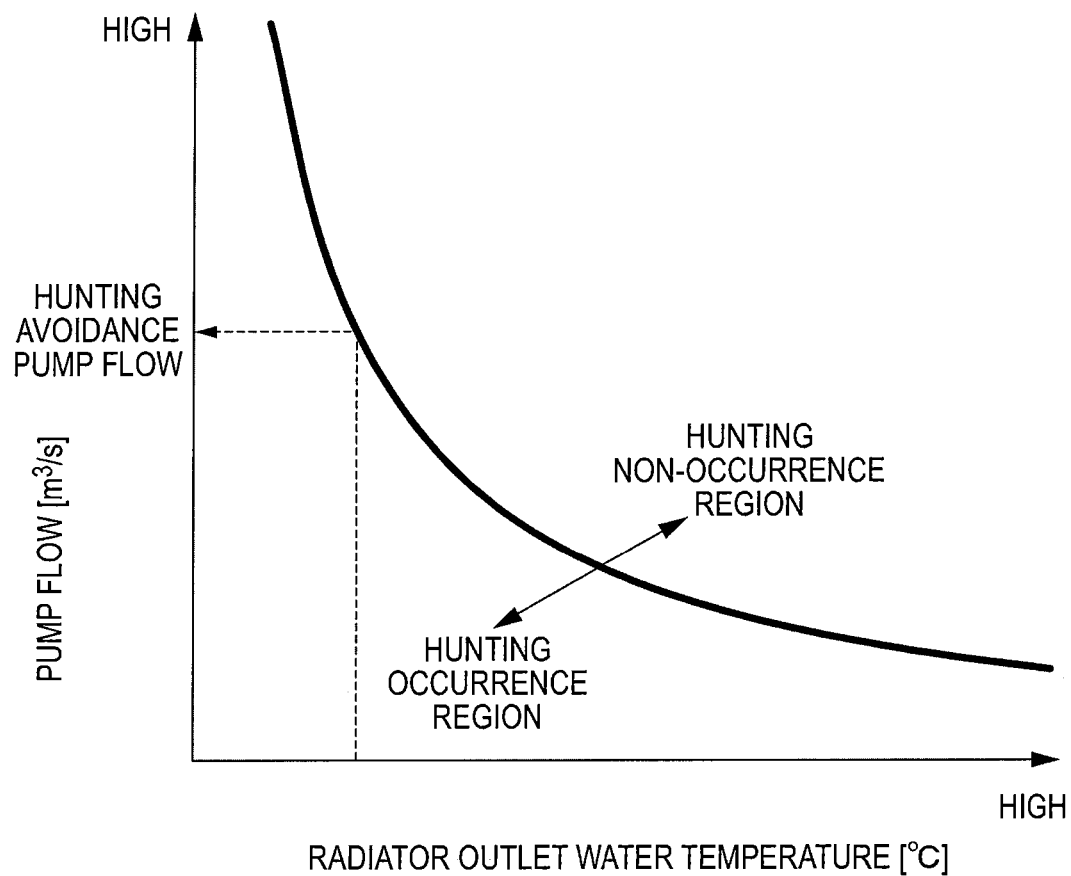
FIG. 7 is a table used to calculate a hunting avoidance pump flow on the basis of the radiator outlet water temperature.

FIG. 7 is the table used to calculate the hunting avoidance pump flow on the basis of the radiator outlet water temperature.

On this table, similarly to the table shown in FIG. 5, the boundary line on which hunting occurs, which is determined in advance from the radiator outlet water temperature and the pump flow by experiment or the like, is used to calculate the hunting avoidance pump flow on the basis of the radiator outlet water temperature.

According to the embodiment described above, when the radiator outlet water temperature (the outside air temperature) is low and it is determined that hunting may be caused by opening the thermostat 44, the pump flow is increased relative to the basic pump flow at the point where the temperature (the stack inlet temperature) of the cooling water in the thermostat 44 increases beyond the increase start temperature. The increase start temperature is set at a slightly lower temperature than the thermostat opening temperature.

In so doing, the pump flow can be increased immediately before the thermostat 44 opens, enabling an increase in the flow of the cooling water flowing into the thermostat 44 through the bypass passage 43. Accordingly, the flow velocity of the cooling water flowing through the thermostat 44 increases, and therefore a rapid decrease in the cooling water temperature in the thermostat 44 occurring when the thermostat 44 is opened such that the cooling water passing through the radiator 42 flows therein can be suppressed. As a result, hunting can be suppressed.

Further, the pump flow is not increased until immediately before the thermostat 44 opens, and therefore deterioration of the system efficiency and the warm-up performance of the fuel cell system can be suppressed.

Furthermore, according to this embodiment, it is determined that hunting may occur when the radiator outlet water temperature is equal to or lower than the hunting occurrence radiator outlet water temperature. At this time, the hunting occurrence radiator outlet water temperature is varied on the basis of the basic pump flow. Hence, the determination as to whether or not hunting may occur can be made with a high degree of precision, and therefore the pump flow is not increased needlessly. As a result, the efficiency of the fuel cell system can be improved.

Moreover, according to this embodiment, the increase stop temperature is set in accordance with the closing characteristic of the thermostat 44 at a temperature at which the stack inlet water temperature does not return to the thermostat closing temperature after the correction to increase the pump flow is stopped.

Therefore, hunting can be suppressed reliably, and the pump flow is not increased excessively. As a result, an electrical efficiency of the fuel cell system can be prevented from deteriorating.

Second Embodiment

Next, a second embodiment of the present invention will be described. The second embodiment of the present invention differs from the first embodiment in that when the pump flow of the circulating pump 45 is increased, the cathode pressure is reduced. The following description focuses on this difference. It should be noted that in the embodiments to be described below, parts exhibiting similar functions to the first embodiment have been allocated identical reference symbols, and duplicate description thereof has been omitted where appropriate.

When the pump flow of the circulating pump 45 is increased above the basic pump flow, either an increase speed of the stack temperature decreases or the stack temperature decreases. As a result, the proportion of the water generated in the interior of the fuel cell stack 1 that turns into water vapor and is discharged as cathode off gas decreases, and therefore the moisture content of the polymer electrolyte membrane tends to increase.

Hence, in this embodiment, the proportion of generated water that turns into water vapor and is discharged as cathode off gas is increased by reducing the cathode pressure when the pump flow of the circulating pump 45 is increased above the basic pump flow. In other words, when the pump flow of the circulating pump 45 is increased above the basic pump flow, an operating condition in which the polymer electrolyte membrane is dried to a greater extent than normal is established by reducing the cathode pressure below a normal cathode pressure. In so doing, the moisture content of the polymer electrolyte membrane can be kept constant.

Figure 8:
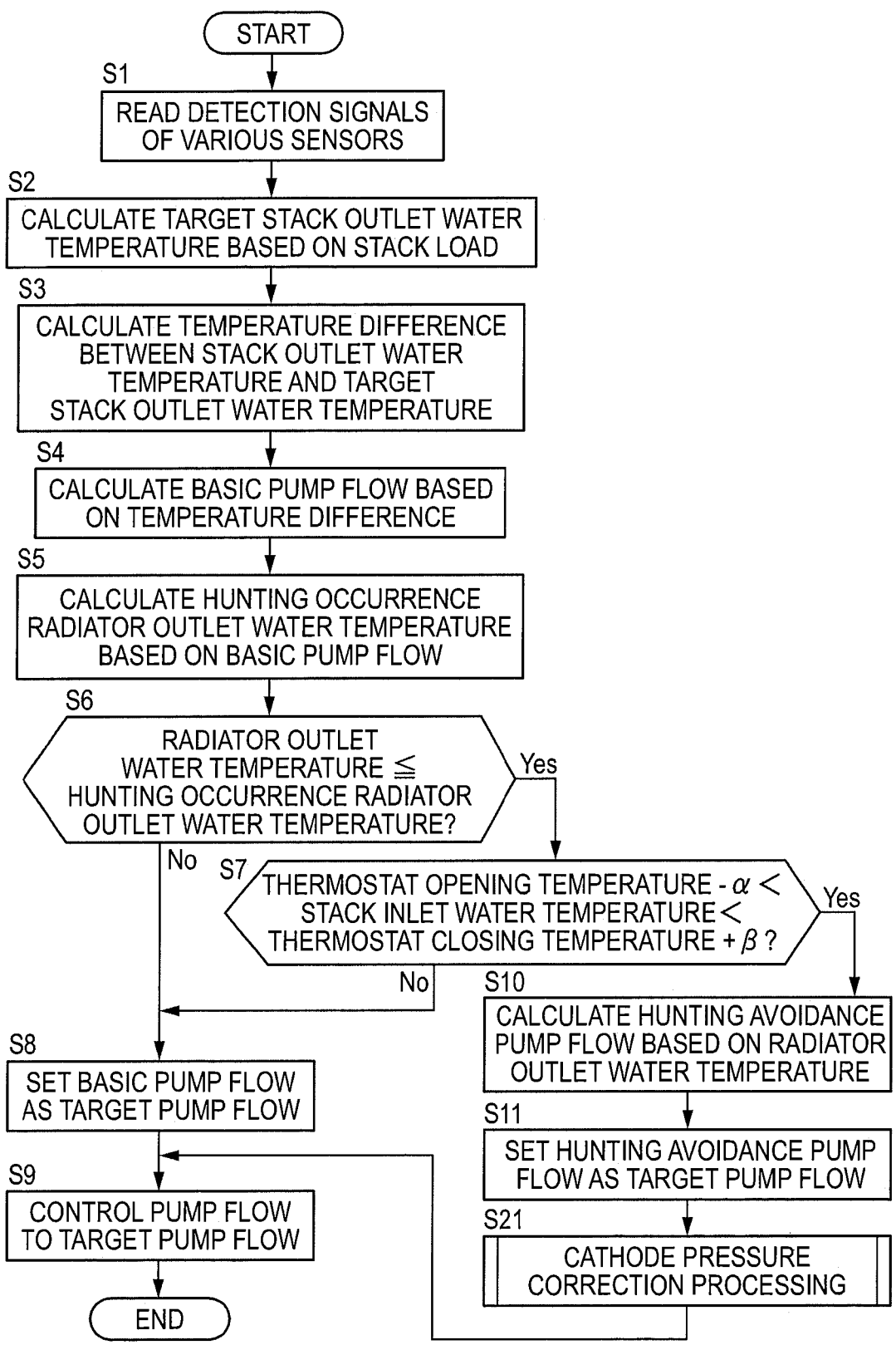
FIG. 8 is a flowchart illustrating pump flow control performed on a circulating pump according to a second embodiment of the present invention.

FIG. 8 is a flowchart illustrating control of the pump flow of the circulating pump 45 according to this embodiment. The controller 5 executes this routine at predetermined calculation period intervals (every 10 [ms], for example) while the fuel cell system is operative.

Processing from the step S1 to the step S11 is identical to the first embodiment.

In a step S21, the controller 5 implements cathode pressure correction processing to correct the cathode pressure. The cathode pressure correction processing will be described below with reference to FIGS. 9 to 11.

Figure 9:
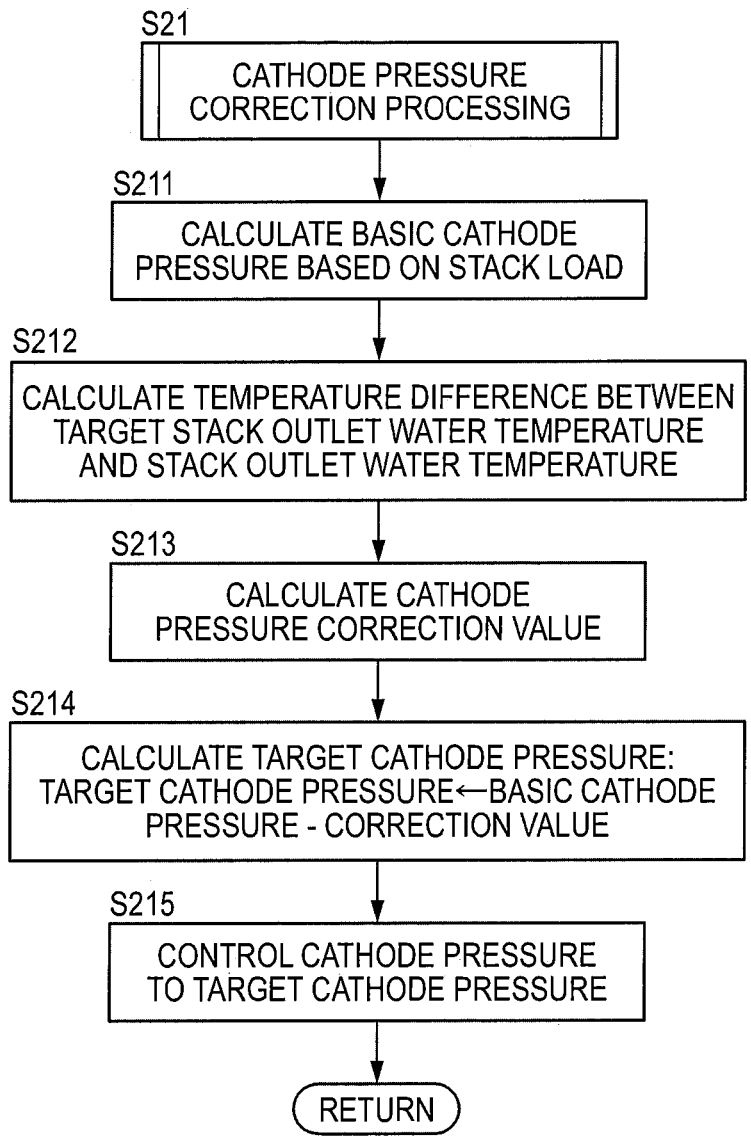
FIG. 9 is a flowchart illustrating cathode pressure correction processing.

FIG. 9 is a flowchart illustrating the cathode pressure correction processing.

Figure 10:
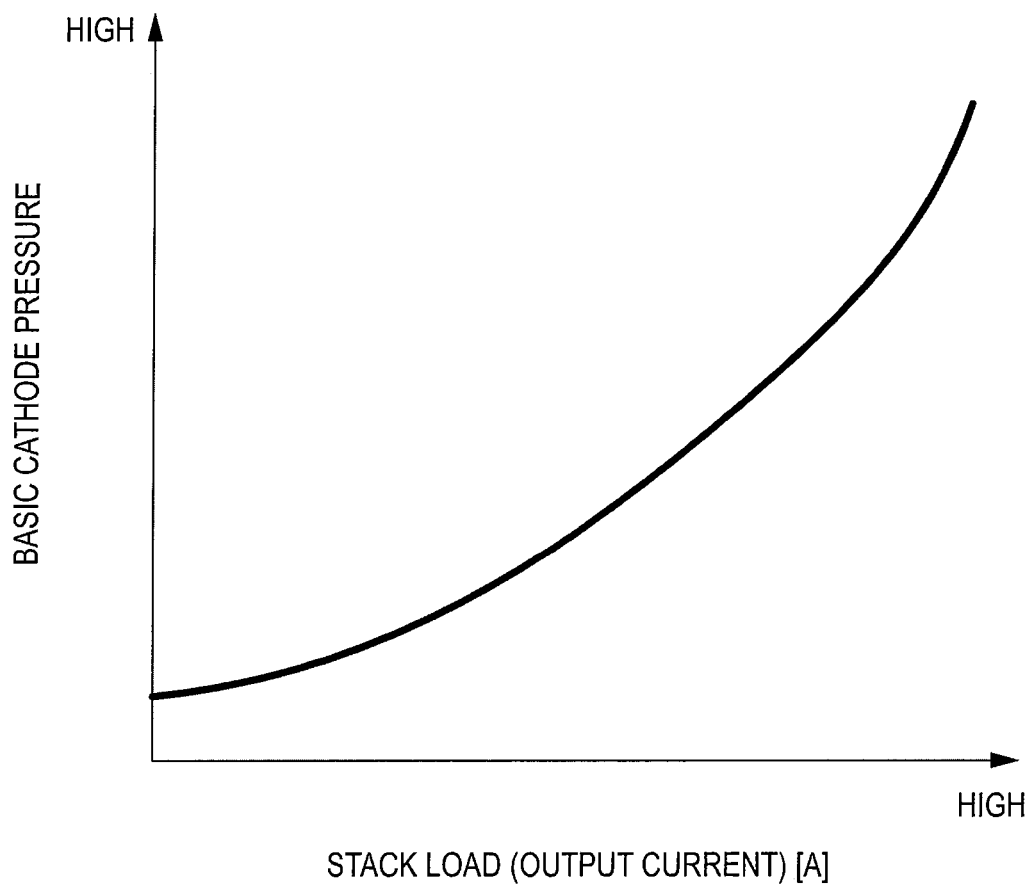
FIG. 10 is a table used to calculate a basic cathode pressure on the basis of the stack load.

In a step S211, the controller 5 calculates a basic value of the cathode pressure (to be referred to hereafter as a "basic cathode pressure") on the basis of the stack load by referring to a table shown in FIG. 10.

In a step S212, the controller 5 calculates the temperature difference between the target stack outlet water temperature (step S2) and the stack outlet water temperature detected by the first water temperature sensor 47.

Figure 11:
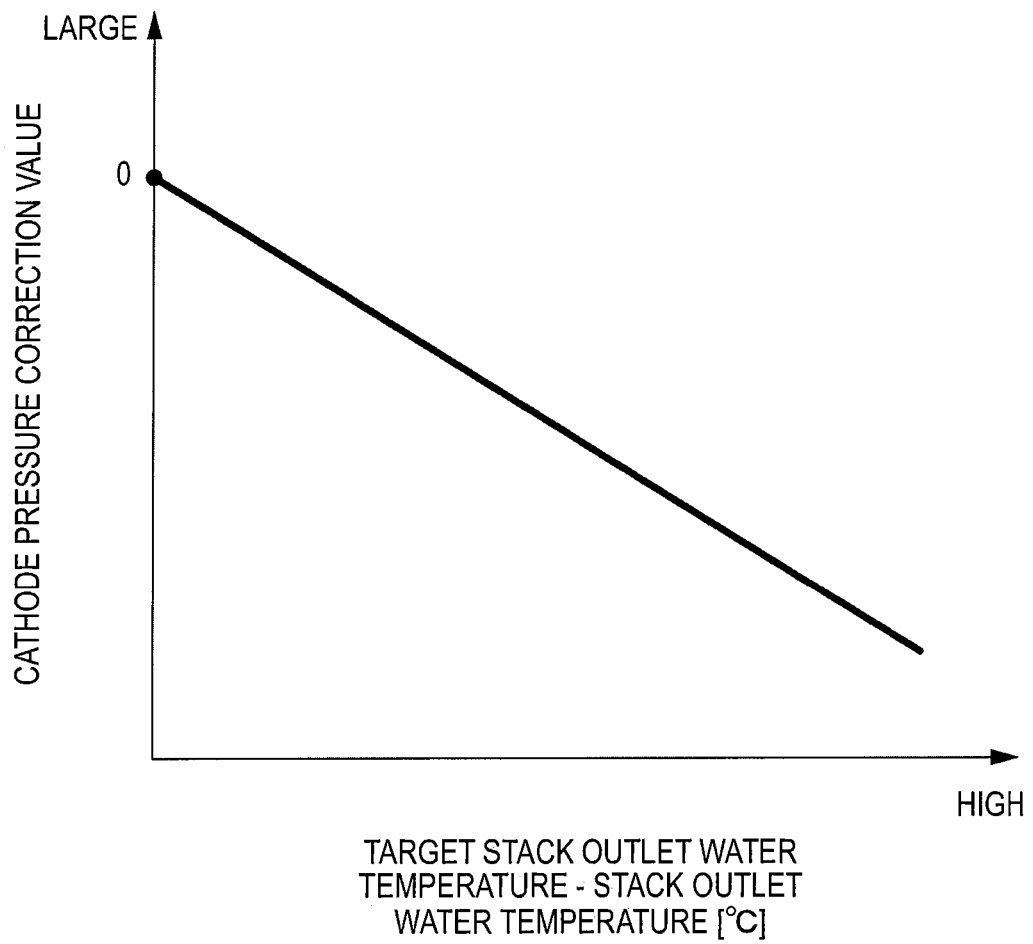
FIG. 11 is a table used to calculate a cathode pressure correction value on the basis of the target stack outlet water temperature and an average water temperature.

In a step S213, the controller 5 calculates a cathode pressure correction value on the basis of the temperature difference between the target stack outlet water temperature and the stack outlet water temperature by referring to a table shown in FIG. 11. As shown in FIG. 11, the cathode pressure correction value is set to decrease as the temperature difference between the target stack outlet water temperature and the stack outlet water temperature increases. The reason for setting the cathode pressure correction value thus is that when the stack outlet water temperature is lower than the target stack outlet water temperature, this means that the temperature of the fuel cell stack 1 is relatively low, and therefore the moisture content of the polymer electrolyte membrane increases as the temperature difference increases.

In a step S214, the controller 5 calculates a target cathode pressure by adding together the basic cathode pressure and the cathode pressure correction value.

In a step S215, the controller 5 controls the opening of the cathode pressure regulating valve 25 such that the cathode pressure reaches the target cathode pressure.

According to this embodiment, as described above, the cathode pressure is reduced when the pump flow of the circulating pump 45 is increased above the basic pump flow. More specifically, when the pump flow of the circulating pump 45 is increased above the basic pump flow, the moisture content of the polymer electrolyte membrane tends to increase, and therefore the polymer electrolyte membrane is dried by reducing the cathode pressure below a normal value. In so doing, similar effects to the first embodiment are obtained, and in addition, a reduction in the proportion of generated water that turns into water vapor and is discharged as cathode off gas can be suppressed even when the pump flow is increased such that the stack temperature exhibits a decreasing tendency. As a result, the moisture content of the polymer electrolyte membrane can be kept constant.

Third Embodiment

Next, a third embodiment of the present invention will be described. The third embodiment of the present invention differs from the first embodiment in that when the pump flow of the circulating pump 45 is increased, a cathode gas flow is increased. The following description focuses on this difference. It should be noted that in the embodiments to be described below, parts exhibiting similar functions to the first embodiment have been allocated identical reference symbols, and duplicate description thereof has been omitted where appropriate.

As described above, when the pump flow of the circulating pump 45 is increased above the basic pump flow, the proportion of the generated water generated in the interior of the fuel cell stack that turns into water vapor and is discharged as cathode off gas decreases, and therefore the moisture content of the polymer electrolyte membrane tends to increase.

Hence, in this embodiment, an amount of water vapor discharged from the fuel cell stack 1 is increased by increasing the cathode gas flow when the pump flow of the circulating pump 45 is increased above the basic pump flow. In other words, when the pump flow of the circulating pump 45 is increased above the basic pump flow, an operating condition in which the polymer electrolyte membrane is dried to a greater extent than normal is established by increasing the cathode gas flow above a normal cathode gas flow. In so doing, the moisture content of the polymer electrolyte membrane can be kept constant.

Figure 12:
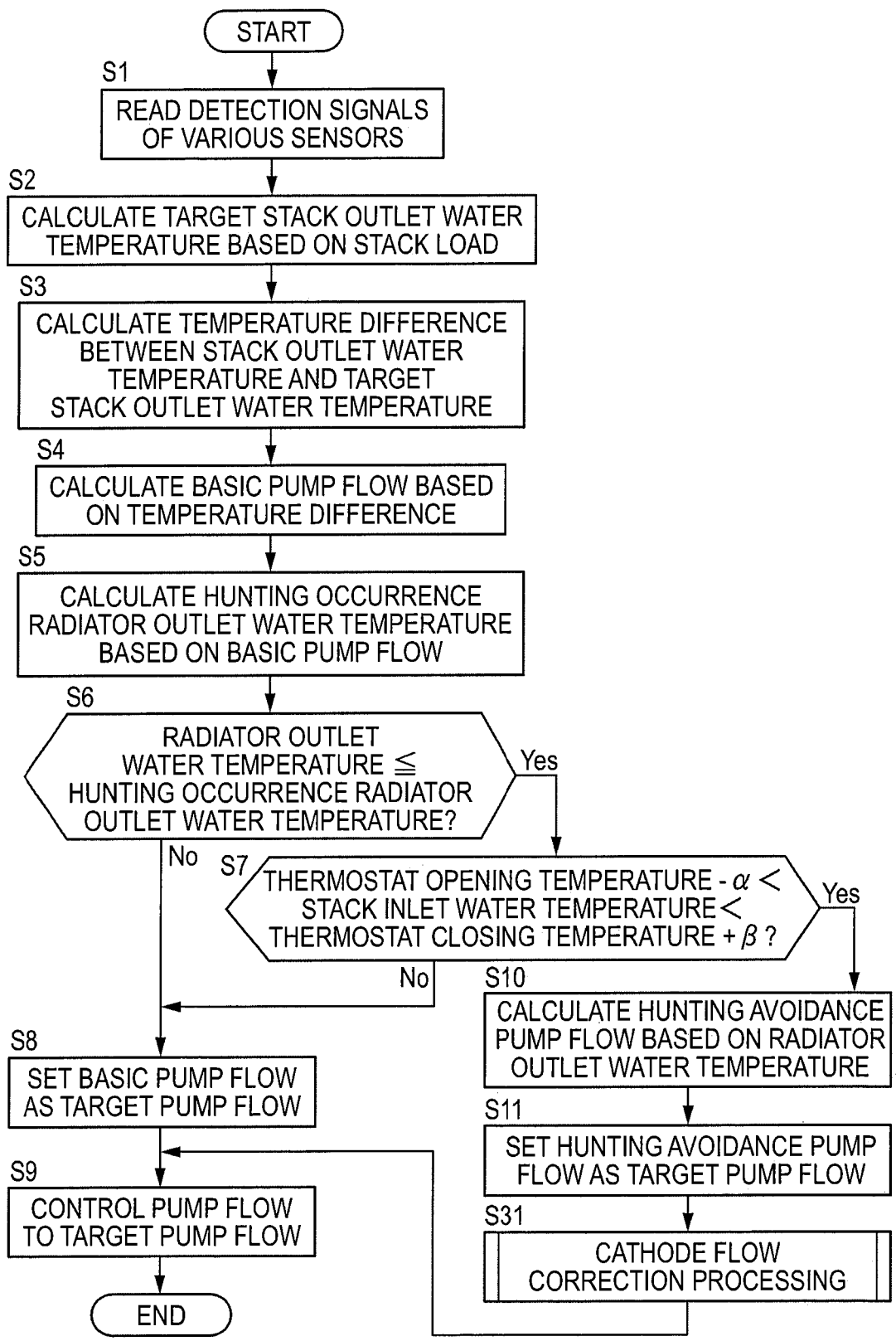
FIG. 12 is a flowchart illustrating pump flow control performed on a circulating pump according to a third embodiment of the present invention.

FIG. 12 is a flowchart illustrating control of the pump flow of the circulating pump 45 according to this embodiment. The controller 5 executes this routine at predetermined calculation period intervals (every 10 [ms], for example) while the fuel cell system is operative.

Processing from the step S1 to the step S11 is identical to the first embodiment.

In a step S31, the controller 5 implements cathode flow correction processing to correct the cathode gas flow. The cathode flow correction processing will be described below with reference to FIGS. 13 to 15.

Figure 13:
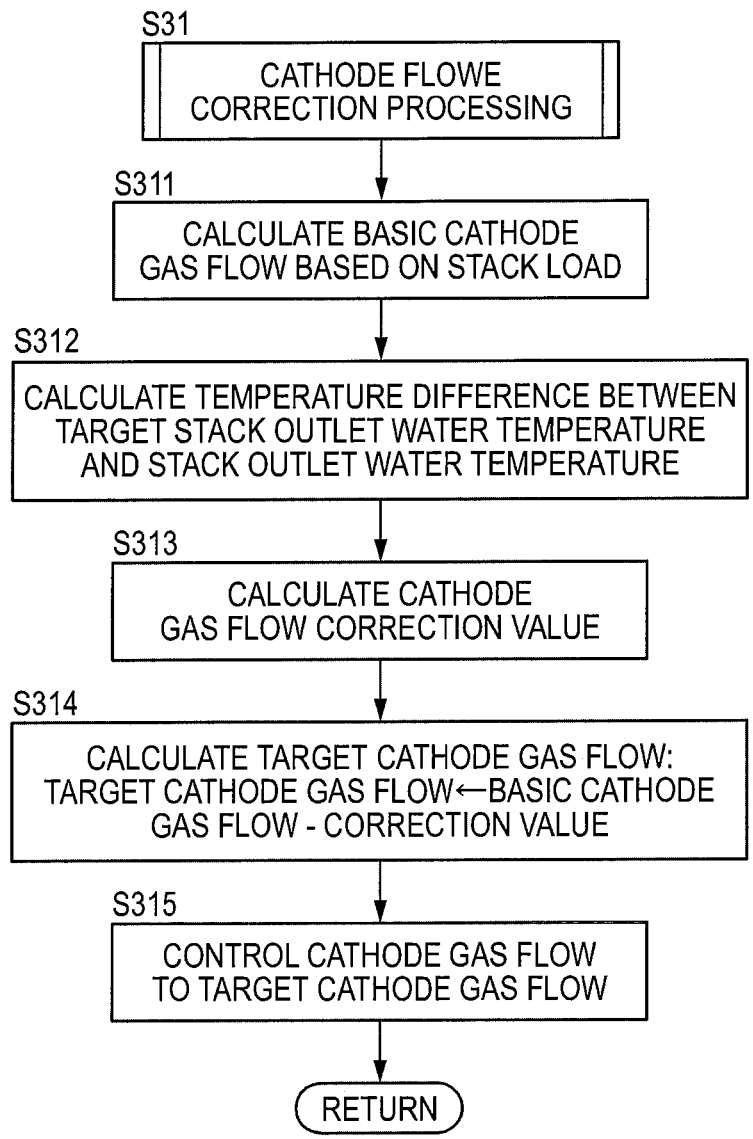
FIG. 13 is a flowchart illustrating cathode gas flow correction processing.

FIG. 13 is a flowchart illustrating the cathode flow correction processing.

Figure 14:
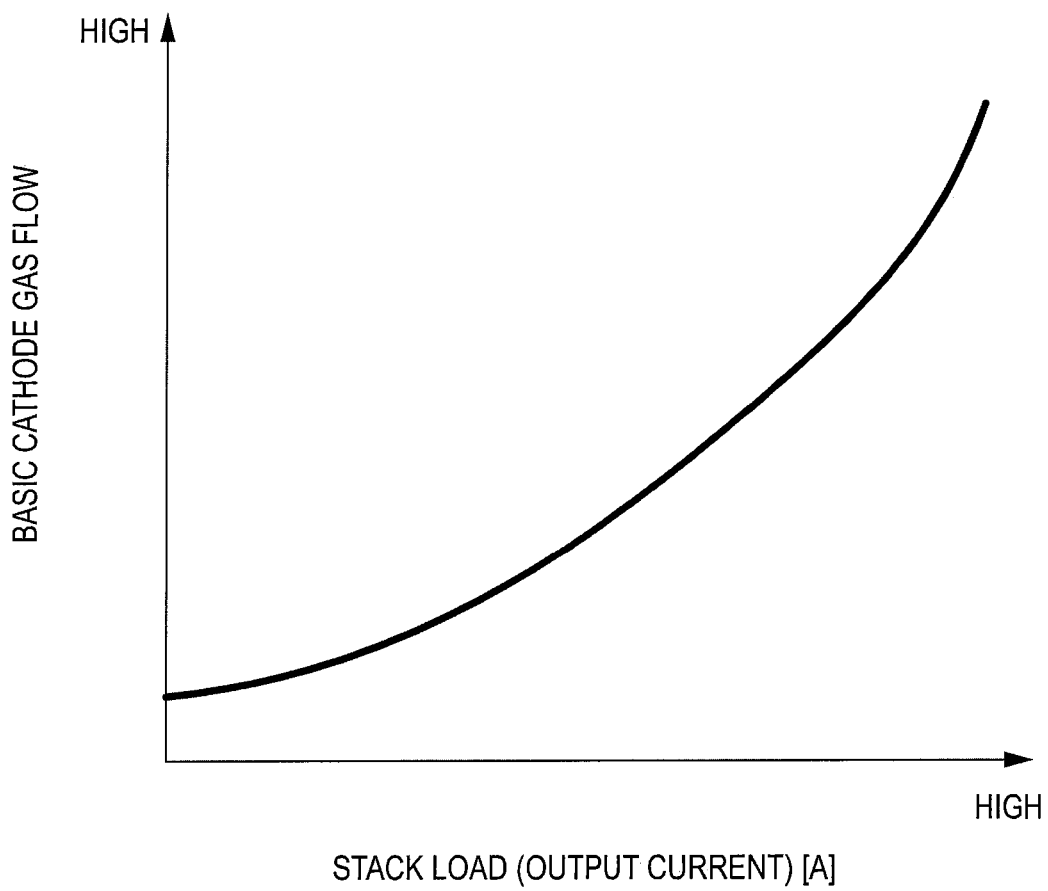
FIG. 14 is a table used to calculate a basic cathode gas flow on the basis of the stack load.

In a step S311, the controller 5 calculates a basic value (to be referred to hereafter as a "basic cathode gas flow") of the flow of the cathode gas supplied to the fuel cell stack 1 on the basis of the stack load by referring to a table shown in FIG. 14.

In a step S312, the controller 5 calculates the temperature difference between the target stack outlet water temperature (step S2) and the stack outlet water temperature detected by the first water temperature sensor 47.

Figure 15:
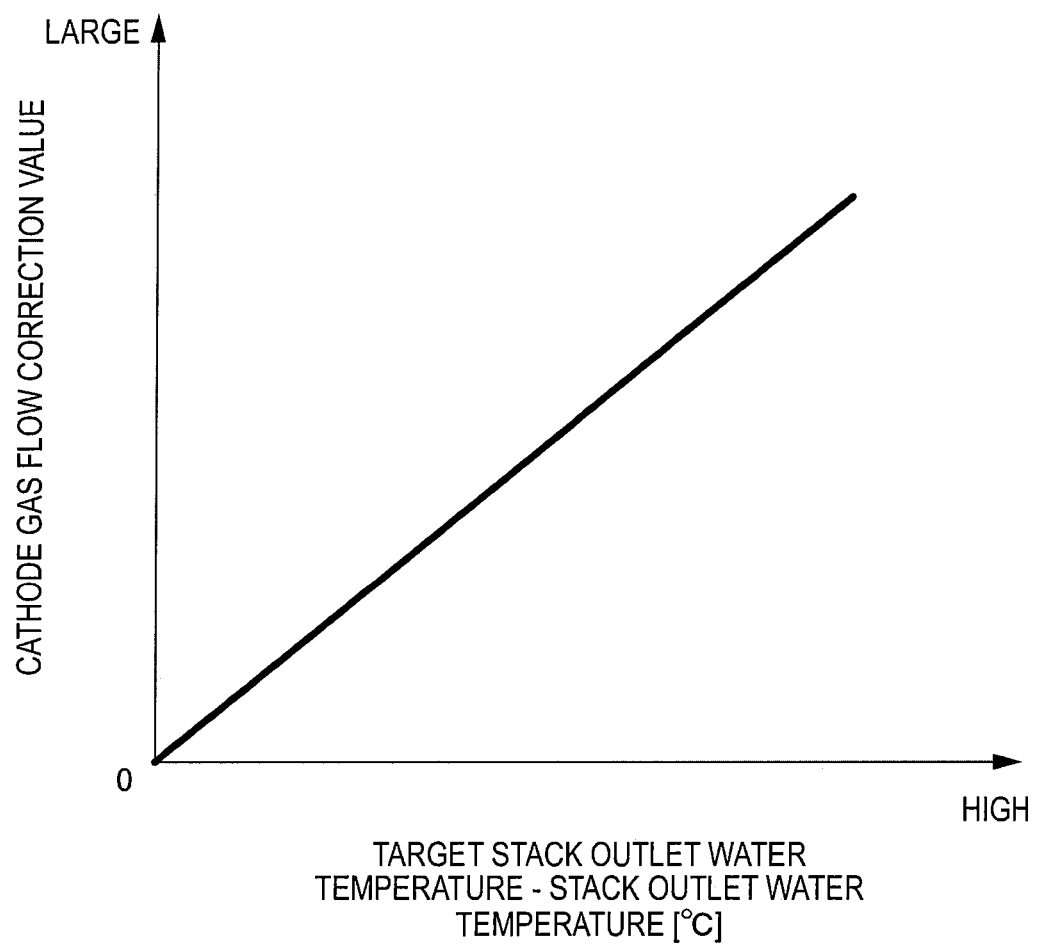
FIG. 15 is a table used to calculate a cathode gas flow correction value on the basis of the target stack outlet water temperature and the average water temperature.

In a step S313, the controller 5 calculates a cathode gas flow correction value on the basis of the temperature difference between the target stack outlet water temperature and the stack outlet water temperature by referring to a table shown in FIG. 15. As shown in FIG. 15, the cathode gas flow correction value is set to increase as the temperature difference between the target stack outlet water temperature and the stack outlet water temperature increases.

In a step S314, the controller 5 calculates a target cathode gas flow by adding together the basic cathode gas flow and the cathode gas flow correction value.

In a step S315, the controller 5 controls a rotation speed of the cathode compressor 23 such that the cathode gas flow reaches the target cathode gas flow.

According to this embodiment, as described above, the cathode gas flow is increased when the pump flow of the circulating pump 45 is increased above the basic pump flow. More specifically, when the pump flow of the circulating pump 45 is increased above the basic pump flow, the moisture content of the polymer electrolyte membrane tends to increase, and therefore the polymer electrolyte membrane is dried by increasing the cathode gas flow above a normal value. In so doing, similar effects to the first embodiment are obtained, and in addition, the amount of generated water discharged from the fuel cell stack 1 can be increased even when the pump flow is increased such that the stack temperature exhibits a decreasing tendency. As a result, the moisture content of the polymer electrolyte membrane can be kept constant.

Embodiments of the present invention were described above, but the above embodiments merely illustrate a part of examples of applications of the present invention, and the technical scope of the present invention is not limited to the specific configurations described in the above embodiments.

For example, when the pump flow of the circulating pump 45 is increased above the basic pump flow, the moisture content of the polymer electrolyte membrane may be kept constant by controlling the cathode gas and the cathode gas flow in conjunction. Further, when the moisture content of the polymer electrolyte membrane can be measured or estimated, the pressure correction amount of the second embodiment and the flow correction amount of the third embodiment may be set on the basis of the moisture content of the polymer electrolyte membrane so as to increase as the moisture content increases.

Furthermore, in the above embodiments, the hunting occurrence radiator outlet water temperature is varied on the basis of the basic pump flow, but the hunting occurrence radiator temperature when the basic pump flow is at the minimum flow may be set as a fixed value.

Further, in the first embodiment, the pump flow is controlled on the basis of the detected power generation current by referring to the target outlet water temperature in FIG. 3, but instead, the pump flow may be controlled as follows.

First, a target internal resistance (internal impedance) of the fuel cell stack 1 is read. The target internal resistance may be a single value set by experiment or the like, taking into consideration subzero startup and a power generation efficiency, or may be variable according to the current and other conditions. Next, an internal resistance of the fuel cell stack 1 is detected. The pump flow may then be controlled on the basis of the target internal resistance and the detected internal resistance. For example, when the detection value is larger than the target internal resistance, this means that a humidity condition (the moisture content) of the polymer electrolyte membrane is on a dry side of a target, and therefore the temperature of the fuel cell stack 1 is reduced by increasing the pump flow in order to humidify the fuel cell stack 1.

Further, in the second and third embodiments, the cathode pressure and cathode gas flow correction values are calculated in accordance with the temperature difference between the target stack outlet water temperature and the stack outlet water temperature, but may be calculated in accordance with an average water temperature of the stack outlet water temperature and the stack inlet water temperature.

This application claims priority based on Japanese Patent Application No. 2011-191814, filed with the Japan Patent Office on Sep. 2, 2011, the entire contents of which are incorporated into the present specification by reference.

The invention claimed is:

1. A fuel cell system that generates power by supplying an anode gas and a cathode gas to a fuel cell, comprising:
   a coolant circulation passage through which a coolant for cooling the fuel cell circulates;
   a pump provided in the coolant circulation passage to circulate the coolant;
   a radiation unit provided in the coolant circulation passage to cool the coolant by discharging heat from the coolant;
   a bypass passage connected to the coolant circulation passage so as to bypass the radiation unit;

an open/close valve that is provided in a convergence portion where low temperature coolant that has passed through the radiation unit and high temperature coolant that has passed through the bypass passage without passing through the radiation unit converge, and that opens when a temperature of the high temperature coolant reaches or exceeds a predetermined opening temperature, such that the low temperature coolant and the high temperature coolant converge and are supplied to the fuel cell;

a first water temperature sensor that is provided in the coolant circulation passage, being positioned downstream of the fuel cell and upstream of the convergence portion; and a controller programmed to:
calculate a basic discharge flow of the pump in accordance with a condition of the fuel cell comprising a temperature difference between a detected value by the first water temperature sensor and a target value of a stack outlet water temperature, the stack outlet water temperature being a temperature of a cooling water discharged from the fuel cell;

obtain an outside air temperature as a temperature of the low temperature coolant, the outside air temperature detected by an outside air temperature sensor;

set a discharge flow of the pump to the basic discharge flow when the outside air temperature is not lower than a predetermined temperature; and increase the discharge flow of the pump above the basic discharge flow when the outside air temperature is lower than the predetermined temperature.

2. The fuel cell system as defined in claim 1, wherein the controller is further programmed to steadily increase the discharge flow of the pump above the basic discharge flow as the temperature of the low temperature coolant decreases.

3. The fuel cell system as defined in claim 1, wherein the controller is further programmed to vary the predetermined temperature on the basis of the basic discharge flow such that the predetermined temperature increases as the basic discharge flow decreases.

4. The fuel cell system as defined in claim 1, wherein the controller is further programmed to start to increase the discharge flow of the pump when a temperature of the coolant that is supplied to the fuel cell after passing through the open/close valve reaches a predetermined increase start temperature, which is lower than the opening temperature of the open/close valve.

5. The fuel cell system as defined in claim 1, wherein the controller is further programmed to stop increasing the discharge flow of the pump when the temperature of the coolant that is supplied to the fuel cell after passing through the open/close valve reaches a predetermined increase stop temperature, which is higher than the opening temperature of the open/close valve.

6. The fuel cell system as defined in claim 1, wherein the controller is further programmed to reduce a pressure in a cathode gas passage inside the fuel cell when the discharge flow of the pump is increased above the basic discharge flow.

7. The fuel cell system as defined in claim 1, wherein the controller is further programmed to increase a cathode gas supply flow when the discharge flow of the pump is increased above the basic discharge flow.

8. The fuel cell system as defined in claim 1, further comprising:
a second water temperature sensor provided in the coolant circulation passage downstream of the bypass passage and a thermostat, the second water temperature sensor configured to detect a stack inlet water temperature;

wherein the open/close valve opens in response to the temperature detected by the first water temperature sensor reaching or exceeding the predetermined opening temperature.

9. The fuel cell system as defined in claim 1, further comprising a second water temperature sensor that is provided in the coolant circulation passage at a location that is upstream of the fuel cell and downstream of the pump, wherein the second water temperature sensor detects a stack inlet water temperature.

10. A fuel cell system that generates power by supplying an anode gas and a cathode gas to a fuel cell, comprising:
a coolant circulation passage through which a coolant for cooling the fuel cell circulates;

a pump provided in the coolant circulation passage to circulate the coolant;

a radiation unit provided in the coolant circulation passage to cool the coolant by discharging heat from the coolant;

a bypass passage connected to the coolant circulation passage so as to bypass the radiation unit;

an open/close valve that is provided in a convergence portion where low temperature coolant that has passed through the radiation unit and high temperature coolant that has passed through the bypass passage without passing through the radiation unit converge, and that opens when a temperature of the high temperature coolant reaches or exceeds a predetermined opening temperature, such that the low temperature coolant and the high temperature coolant converge and are supplied to the fuel cell;

a first water temperature sensor that is provided in the coolant circulation passage, being positioned downstream of the fuel cell and upstream of the convergence portion; and a controller programmed to:
calculate a basic discharge flow of the pump in accordance with a condition of the fuel cell comprising a temperature difference between a detected value by the first water temperature sensor and a target value of a stack outlet water temperature, the stack outlet water temperature being a temperature of a cooling water discharged from the fuel cell;

set a discharge flow of the pump to the basic discharge flow when a temperature of the low temperature coolant is not lower than a predetermined temperature; and increase the discharge flow of the pump above the basic discharge flow when a temperature of the low temperature coolant is lower than the predetermined temperature, wherein the predetermined temperature is a temperature at which hunting occurs in the open/close valve when the low temperature coolant converges with the high temperature coolant after the discharge flow of the pump is controlled to the basic discharge flow.

11. A control method for the fuel cell system as defined in claim 1, the control method comprising:
calculating the basic discharge flow of the pump in accordance with the condition of the fuel cell; and increasing the discharge flow of the pump above the basic discharge flow when the temperature of the low temperature coolant is lower than the predetermined temperature.

* * * * *